United States Patent
Nadehara

(10) Patent No.: US 8,713,217 B2
(45) Date of Patent: Apr. 29, 2014

(54) PERMITTING ACCESS OF SLAVE DEVICE FROM MASTER DEVICE BASED ON PROCESS ID'S

(75) Inventor: Kouhei Nadehara, Tokyo (JP)

(73) Assignee: Nec Corporation, Tokyo (JP)

( * ) Notice: Subject to any disclaimer, the term of this patent is extended or adjusted under 35 U.S.C. 154(b) by 175 days.

(21) Appl. No.: 13/255,996

(22) PCT Filed: Apr. 1, 2010

(86) PCT No.: PCT/JP2010/056347
§ 371 (c)(1),
(2), (4) Date: Sep. 12, 2011

(87) PCT Pub. No.: WO2010/119802
PCT Pub. Date: Oct. 21, 2010

(65) Prior Publication Data
US 2012/0023270 A1    Jan. 26, 2012

(30) Foreign Application Priority Data

Apr. 14, 2009   (JP) ................................. 2009-097813

(51) Int. Cl.
*G06F 13/28* (2006.01)
*G06F 3/00* (2006.01)

(52) U.S. Cl.
USPC .............................................. 710/36; 710/22

(58) Field of Classification Search
None
See application file for complete search history.

(56) References Cited

U.S. PATENT DOCUMENTS

RE41,904 E   *   10/2010   Barry ............................. 710/26

FOREIGN PATENT DOCUMENTS

| JP | 63-29849 A | 2/1988 |
|---|---|---|
| JP | 1-265341 A | 10/1989 |
| JP | 2-297656 A | 12/1990 |
| JP | 6-236300 A | 8/1994 |
| JP | 10-240623 A | 9/1998 |
| JP | 11-501141 A | 1/1999 |
| JP | 2001256460 A | 9/2001 |
| JP | 2007011580 A | 1/2007 |
| JP | 2007109053 A | 4/2007 |
| JP | 2008282417 A | 11/2008 |

OTHER PUBLICATIONS

Infineon, 32-Bit, TC1767, 32-Bit Single-Chip Microcontroller, User's Manual V1.1, May 2009.

* cited by examiner

*Primary Examiner* — Idriss N Alrobaye
*Assistant Examiner* — Richard B Franklin
(74) *Attorney, Agent, or Firm* — Sughrue Mion, PLLC

(57) ABSTRACT

A computer system has a master device having a first register for storing a first process ID associated with a software process number. The master device transmits the first process ID onto a system bus when it generates a transaction. The computer system has a slave device holding a second process ID for permitting access. The slave device accepts the transaction when the first process ID and the second process ID meet a predetermined condition.

8 Claims, 11 Drawing Sheets

# PERMITTING ACCESS OF SLAVE DEVICE FROM MASTER DEVICE BASED ON PROCESS ID'S

TECHNICAL FIELD

The present invention relates to a computer system and a method of processing a computer system, and more particularly to a computer system having an access protection mechanism and a method of processing a computer system having an access protection mechanism.

BACKGROUND ART

Currently, the capability required for a computer system is being increased, and functions required for a computer system are being complicated, irrespective of a general-purpose computer system such as a PC or an embedded computer system such as a cellular phone or a car navigation system.

In order to meet high performance requirements, an increased number of systems have a direct memory access controller (hereinafter referred to as a DMAC) operable to perform a high-speed data transfer without use of a microprocessor, or have a plurality of microprocessors or accelerators (dedicated hardware for processing a specific function at a high speed) that are operated in parallel.

Furthermore, a system running a plurality of software processes (hereinafter simply referred to as processes) in parallel under the control of a multitask operating system has commonly been used in order to achieve a complicated function.

When a plurality of processes are running in parallel on a computer system for which a high reliability is required, such as a vehicle-installed device or a medical device, it is essential to install a mechanism (hereinafter simply referred to as a protection mechanism) for providing such a protection that unauthorized access (reading or writing) to an address space, which is caused by a malfunction resulting from a logic bug or noise that is inherent in software of a process, does not destroy states of other processes. The state of a process refers to the content of a memory used by the process or the state of peripheral devices (including internal states).

Patent literatures on the related arts of existing computer systems and existing protection mechanisms of a computer system include JP-A 06-236300 (Patent Literature 1), JP-A 10-240623 (Patent Literature 2), JP-A 01-265341 (Patent Literature 3), JP-A 63-029849 (Patent Literature 4), JP-A 2007-011580 (Patent Literature 5), JP-A 11-501141 (Patent Literature 6), and the like.

Furthermore, non-patent literatures on the related arts include Infineon, TC1767 User's Manual V1.1, the Internet <http://www.infineon.com/dgdl/
   TC1767_UM_V1.0.pdf?folderId=db3a3043156fd5730
   115b892639c0e97&fileId=db3a30431be39b97011bff5-
   30d517bcd> (Non-Patent Literature 1), Collections of
   Standard Technology on the Internet <URL:
http://www.jpo.go.jp/shiryou/s_sonota/hyoujun_gijutsu/
   handoutai_ip/1-3-9.htm>(Non-Patent Literature 2), the
   manual as in Non-Patent Literature 1, p. 11-73(Non-Patent
   Literature 3), and the like.

DISCLOSURE OF THE INVENTION

Problem(s) to be Solved by the Invention

A versatile mechanism such as an MMU or an MPU is provided in an existing protection mechanism where a master device is a microprocessor while a slave device is a memory. For example, the same protection mechanism can be used as it is with configurations having different memory capacities.

Hereinafter, a device that starts a transaction, such as a microprocessor or a DMAC is referred to as a master device, and a target to be accessed in a transaction started by a master device is referred to as a slave device.

However, a permission bit register technique, which is generally used in a case where a master device is a DMAC or a slave device is a peripheral device, is not versatile. For example, if a peripheral device is added, the entire protection mechanism needs to be redesigned with addition of a permission bit. Furthermore, protection mechanisms are almost always different for each design and have no software compatibility. Therefore, control software should also be changed.

Thus, the permission bit register technique is not versatile and has difficulty in reusability. Accordingly, there has been desired a protection mechanism having such unity that it can be applied to any type of a bus master and having such scalability that it can be applied even if the number of slave devices changes.

An object of the present invention is to provide a computer system having a versatile and scalable access protection mechanism that can be applied irrespective of the type and number of master devices and slave devices, which has been a problem as described above.

Means to Solve the Problem

A computer system according to the present invention has a master device having a first register for storing a first process ID associated with a software process number. The master device transmits the first process ID onto a system bus when it generates a transaction.

The computer system has a slave device holding a second process ID for permitting access. The slave device accepts the transaction when the first process ID and the second process ID meet a predetermined condition.

Hereinafter, a set of communications for specifying an address of a memory or an input/output device to be accessed and for reading and writing data is referred to as a transaction.

Furthermore, in a computer system including a master device having a first register for storing a first process ID associated with a software process number, a slave device holding a second process ID for permitting access, and a system bus connected to the master device and the slave device, a master device according to the present invention transmits the first process ID onto the system bus when a transaction is generated.

Moreover, in a computer system including a master device having a first register for storing a first process ID associated with a software process number, a slave device holding a second process ID for permitting access, and a system bus connected to the master device and the slave device, a slave device according to the present invention accepts a transaction when the first process ID and the second process ID meet a predetermined condition.

Furthermore, in a method of processing a computer system according to the present invention, the computer system has a master device having a first register for storing a first process ID associated with a software process number, a slave device holding a second process ID for permitting access, and a system bus connected to the master device and the slave device.

The master device transmits the first process ID onto the system bus when a transaction is generated.

The slave device accepts the transaction when the first process ID and the second process ID meet a predetermined condition.

Effect(s) of the Invention

According to the present invention, a versatile and scalable access protection mechanism can be achieved irrespective of the type or number of master devices and slave devices.

MODE(S) FOR CARRYING OUT THE INVENTION (Existing Computer System)

First, an existing computer system and a protection mechanism thereof will be described with reference to FIGS. 8 to 13 in order to facilitate the understanding of the present invention.

Configurations and operations of a system bus and the vicinity thereof in an existing computer system will be described in the first place.

Hardware of the computer system includes a microprocessor, which executes software, a memory, which stores software and data, peripheral devices, and the like. The peripheral devices refer to an input/output device, an accelerator, and the like.

Figure 8:
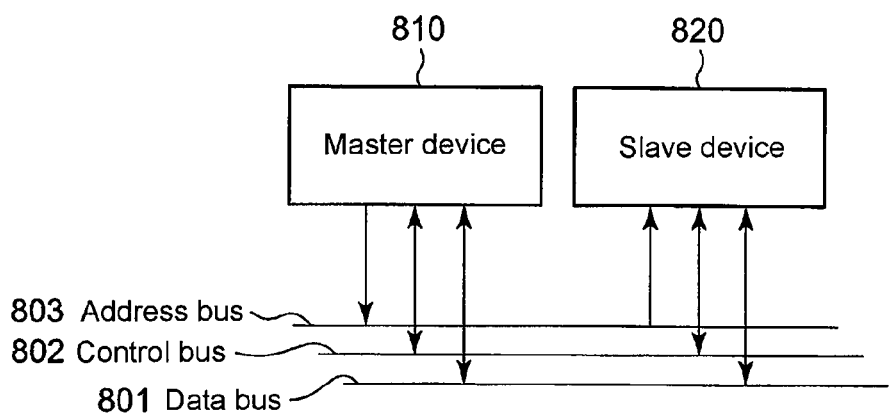
FIG. 8 is a block diagram showing an existing computer system.

As shown in FIG. 8, access to data (reading or writing) is provided via a system bus between those components of the computer system. The system bus includes an address bus 803 for specifying an address to be accessed, a data bus 801 for transferring data located at an address specified by the address bus, a control bus 802 for performing management such as specifying the type of access, and the like.

Here, a set of communications for specifying an address of a memory or an input/output device to be accessed and for reading and writing data as described above is referred to as a transaction. Furthermore, a device that starts a transaction, such as a microprocessor or a DMAC, is referred to as a master device 810, and a target to be accessed in a transaction started by a master device is referred to as a slave device 820.

Because the master device and the slave device are defined to represent functions on the system bus, some devices may have both functions. For example, after a DMAC is initialized as a slave device by a microprocessor, it starts to function as a master device and accesses other slave devices (a peripheral device, a memory, and the like).

Figure 11:
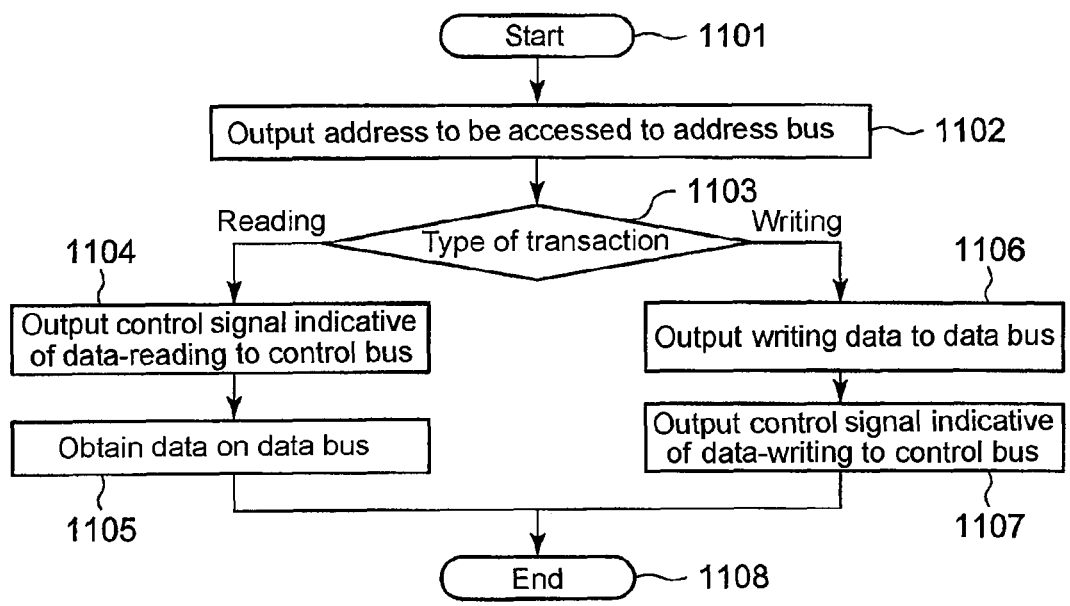
FIG. 11 is a flow chart showing an outlined operation of an existing master device.

Now an outlined procedure of a transaction is illustrated in FIG. 11.

When the master device 810 starts a transaction (Step 1101), it first outputs an address being accessed to the address bus 803 (Step 1102).

Then the master device 810 determines the type of the transaction (Step 1103). If the type of the transaction is data-reading, the master device 810 outputs a control signal indicating that the transaction is a type of data-reading to the control bus 802 (Step 1104).

Finally, the master device 810 obtains data outputted on the data bus 801 by the slave device 820 that has been accessed (Step 1105).

Alternatively, if the type of the transaction is data-writing, the master device 810 outputs writing data to the data bus 801 (Step 1106).

Finally, the master device 810 outputs a control signal indicating that the transaction is a type of data-writing to the control bus 802 (Step 1107).

An operation of an existing slave device will be described along with an example of a peripheral device. An existing peripheral device is connected to the system bus. The existing peripheral device compares a target address of the transaction started by the master device 810 in an address decoder. If the target address coincides with the address of the existing peripheral device, the existing peripheral device is selected as a target of the transaction. For example, access to an internal register of the peripheral device is permitted.

Next, a protection mechanism of an existing computer system will be described.

In the existing technology, different protection mechanisms have been used depending upon a combination of a master device and a slave device.

In a case where a master device is a microprocessor while a slave device is a memory, a memory protection unit (hereinafter referred to as an MPU) or a memory management unit (hereinafter referred to as an MMU) is often installed as a protection mechanism.

The MPU serves as a protection mechanism for permitting a specific process to access only a predetermined memory range such that a state of one process cannot be referred to or changed by other processes. The MPU is frequently used in a low-cost embedded microprocessor. Examples of existing MPUs are disclosed in Patent. Literature 1 and Patent Literature 2.

Figure 9:
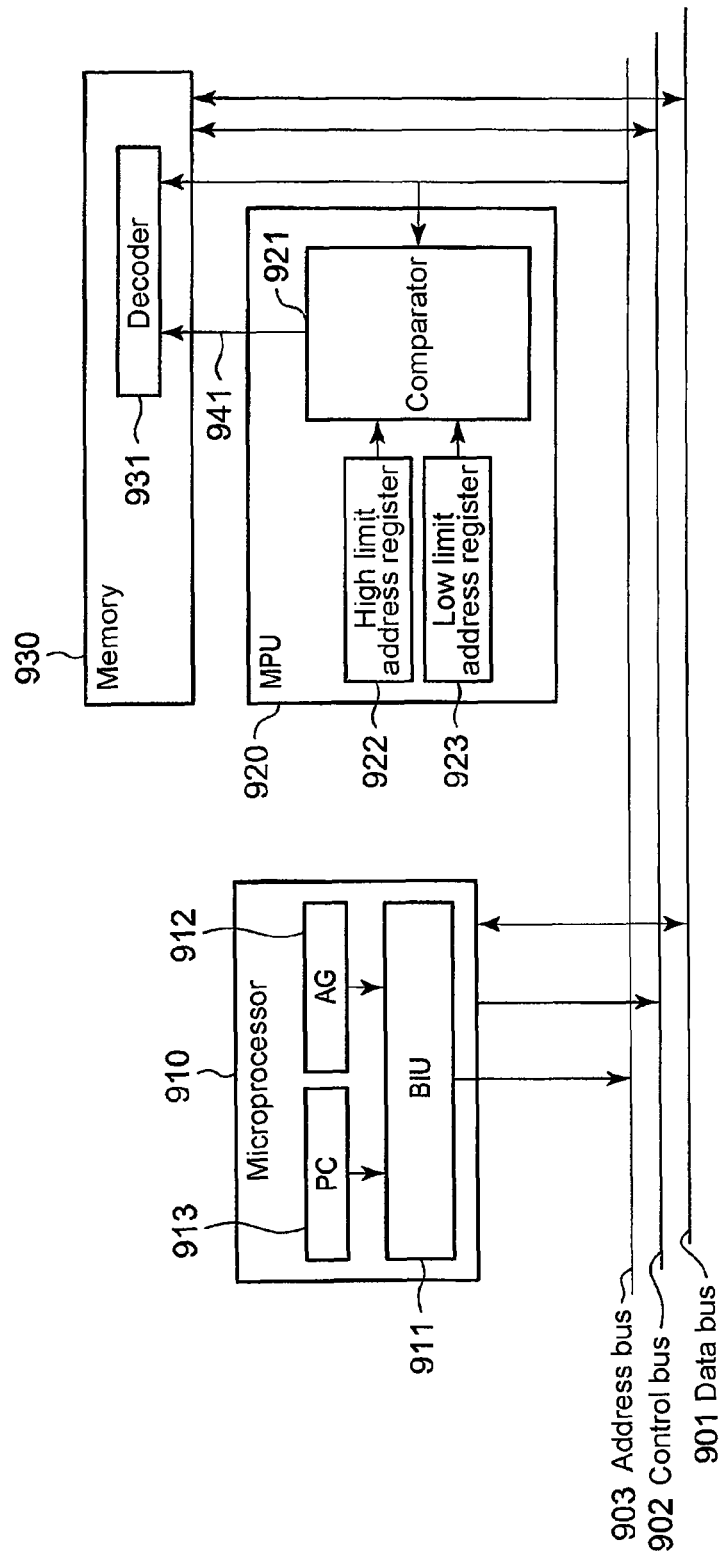
FIG. 9 is a block diagram showing an existing microprocessor and MPU.

A typical configuration of an existing MPU will be described with reference to FIG. 9.

An existing microprocessor 910 is connected to a system bus. The existing microprocessor 910 executes a program on a memory 930 protected by an MPU 920 and generates a bus transaction for accessing data on the memory 930 or a peripheral device.

Figure 12:
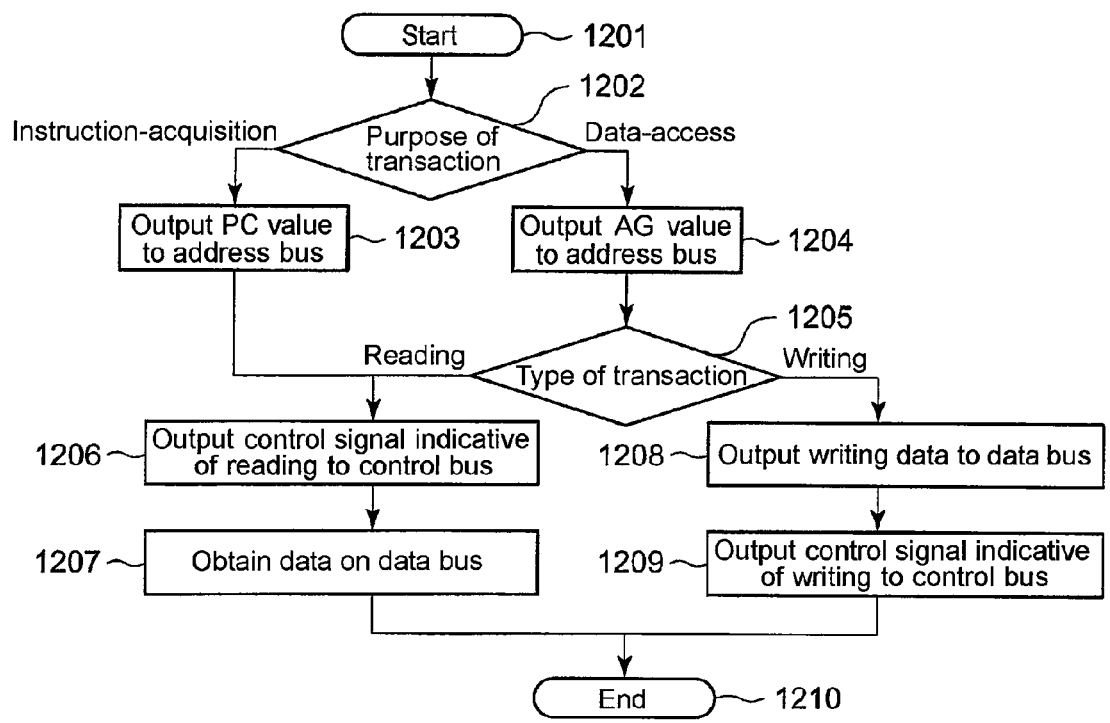
FIG. 12 is a flow chart showing an outlined operation of an existing microprocessor.

FIG. 12 shows a procedure in which the microprocessor 910 generates a bus transaction.

First, a purpose of generation of a bus transaction is determined (Step 1202). If the purpose is to obtain a next machine instruction to be executed in order to execute a program, a bus interface unit (hereinafter referred to as a BIU) 911 outputs a value of a program counter (hereinafter referred to as a PC) 913, which indicates the location of the instruction, to an address bus (Step 1203).

Alternatively, if the purpose is to access data, the BIU 911 outputs a value of an address to be accessed, which has been generated based upon a general-purpose register or an immediate of instruction words by an address generator (hereinafter referred to as an AG) 912, to a system bus (Step 1204).

The subsequent steps (Step 1205 to Step 1209) are the same as in FIG. 11.

The MPU 920 is located between the system bus and the memory 930. The MPU 920 has a high limit address register 922 and a low limit address register 923.

Figure 13:
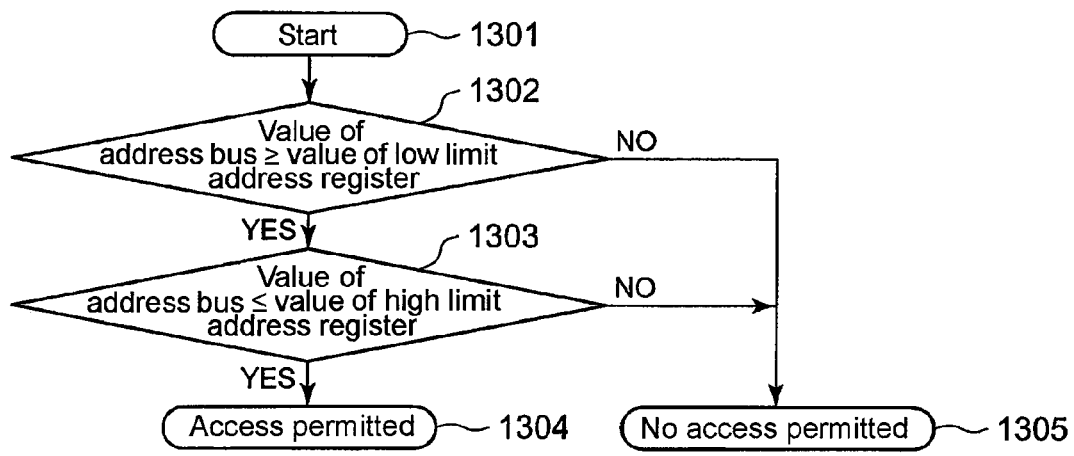
FIG. 13 is a flow chart showing an outlined operation of an existing MPU.

Now an operation of the MPU is illustrated in FIG. 13.

When a transaction occurs, the MPU 920 compares a value of an address bus 903 of the system bus with values of the high limit address register 922 and the low limit address register 923 in a comparator 921. If the value of the address bus is not less than the value of the low limit address register (Step 1302) and is not more than the value of the high limit address register (Step 1303), then access to the memory is permitted (Step 1304). Otherwise, access to the memory is not permitted (Step 1305).

The MPU 920 may have multiple sets of the high limit address register 922 and the low limit address register 923 so as to protect the contents of the memory 930 in detail. Alternatively, as disclosed in Patent Literature 3, there is an example in which software explicitly writes a process ID into the MPU 920, a mechanism for selecting one of sets of the high limit address register 922 and the low limit address register 923 is provided, and an independent protected area can be obtained for each process. Alternatively, some implementations may set high and low limit addresses of a memory area to which access is forbidden, rather than high and low limit addresses of a memory area to which access is permitted.

In general-purpose processors (x86, MIPS, PowerPC, SPARC, and so forth), an MMU is often installed as a protection mechanism when a master device is a microprocessor while a slave device is a memory (Non-Patent Literature 2).

In the MMU, a logical memory space is divided into pages of 4 Kbytes or the like. A corresponding address of a physical memory and an access permission attribute are set for each page. A table that stores those settings is prepared on a main memory for each process. The microprocessor caches and uses part of this table in a translation lookaside buffer (hereinafter referred to as a TLB) within the microprocessor for speed-enhancement.

In a case where the master device is a microprocessor while a slave device is a peripheral device, one of protection mechanisms (hereinafter referred to as a permission bit register technique) uses a register that stores a bitmap of setting permission and non-permission of access for each peripheral device. The permission bit register technique is more suitable than a protection mechanism using an MMU or an MPU in view of the characteristics of a peripheral device, which is generally assigned to a fixed address with occupation of a small address space (about several tens of bytes).

Other examples of more versatile methods include storing a permission bit table having 1 bit for a 1-byte I/O address on a main memory (Patent Literature 4). However, since the table is referred to for each access, the efficiency is problematically low.

A technique in which the permission bit register technique is extended to a memory may be used when the master device is a peripheral device. Some examples use a register that stores a bitmap of setting permission and non-permission of access for each fixed memory area or peripheral device (Non-Patent Literature 3).

A versatile mechanism such as an MMU or an MPU is provided in an existing protection mechanism where a master device is a microprocessor while a slave device is a memory. For example, the same protection mechanism can be used as it is with configurations having different memory capacities.

However, the permission bit register technique, which is generally used in a case where a master device is a DMAC or a slave device is a peripheral device, is not versatile. For example, if a peripheral device is added, the entire protection mechanism needs to be redesigned with addition of a permission bit. Furthermore, protection mechanisms are almost always different for each design and have no software compatibility. Therefore, control software should also be changed.

Thus, the permission bit register technique is not versatile and has difficulty in reusability. Accordingly, there has been desired a protection mechanism having such unity that it can he applied to any type of a bus master and having such scalahility that it can be applied even if the number of slave devices changes.

An embodiment of the present invention provides a versatile and scalable access protection mechanism that can be applied to a computer system irrespective of the type and number of master devices and slave devices.

For this purpose, according to an embodiment of the present invention, a master device has a register for storing a value of a process ID of software being currently executed and simultaneously transmits the process ID and an address to be accessed when a transaction is generated on a system bus. A target device has a register for storing a process ID for permitting access and accepts only a transaction in which process IDs coincide with each other.

Embodiments of the Present Invention

Next, embodiments of the present invention will be described with reference to the drawings.

Figure 1:
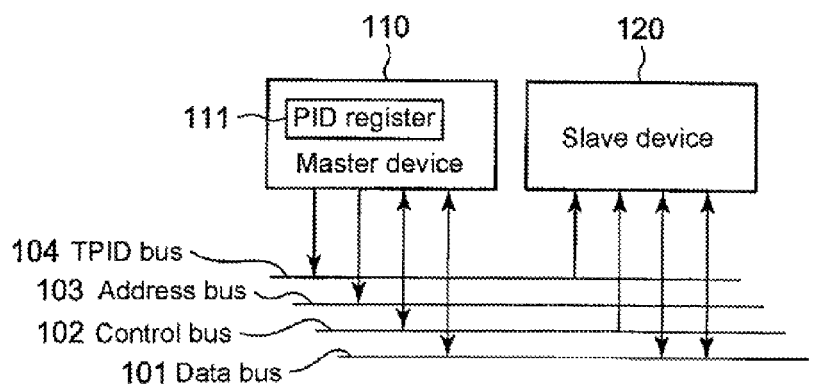
FIG. 1 is a block diagram showing a computer system according to an embodiment of the present invention.

First, an operation of a master device of a computer system according to the present invention will be described as a first embodiment with reference to FIG. 1.

A system bus according to the present invention includes a transaction process identifier bus (hereinafter referred to as a TPID bus) 104 in addition to an address bus 103 for specifying an address to be accessed, a data bus 101 for transferring data located at an address specified by the address bus 103, and a control bus 102 for performing management such as specifying the type of access.

A master device 110, which is connected to the system bus according to an embodiment of the present invention, has a process identifier register 111 (hereinafter referred to as a PID register).

Figure 5:
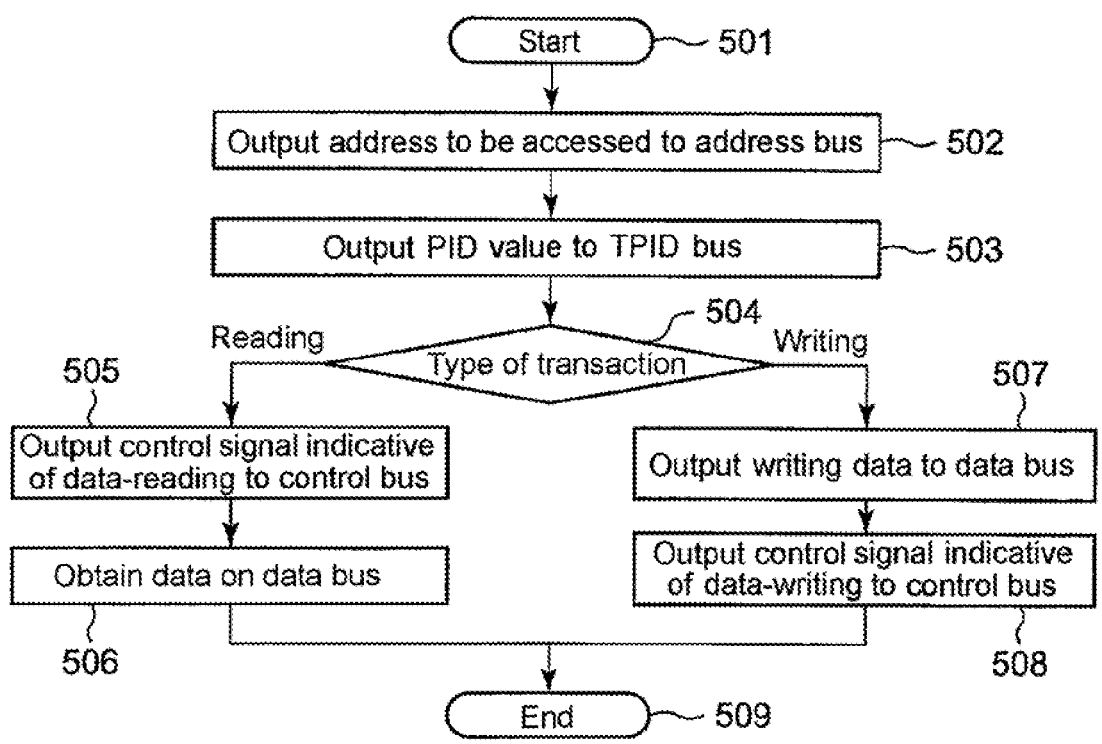
FIG. 5 is a flow chart showing an outlined operation of a master device according to an embodiment of the present invention.

FIG. 5 shows a procedure in which the master device 110 connected on the system bus generates a transaction and accesses a slave device 120.

When the master device 110 starts a transaction (Step 501), it first outputs an address to be accessed to the address bus 103 (Step 502) and outputs a value of the PID register 111 to the TPID bus 104 (Step 503).

Then the master device 110 determines the type of the transaction (Step 504). If the type of the transaction is data-reading, the master device 110 outputs a control signal indicating that the transaction is a type of data-reading to the control bus 102 (Step 505).

Finally, the master device 110 obtains data outputted on the data bus 101 by the slave device 120 that has been accessed (Step 506).

If the type of the transaction is data-writing, the master device 110 outputs writing data to the data bus 101 (Step 507).

Finally, the master device 110 outputs a control signal indicating that the transaction is a type of data-writing to the control bus (Step 508).

These steps are described as a summary of a typical bus transaction. The address, the data, the control signal, and the TPID may be interchanged in output order depending upon a based bus protocol. Arbitration of the right of access to the bus, extension or cancellation of the transaction, and controls for other additional functions may be added in some cases.

Next, a peripheral device (such as an input/output device) assigned to a fixed address according to a second embodiment of the present invention will be described as the simplest slave device with reference to FIG. 2.

A comparator 212 in a slave device 210 according to the present invention compares a value that has been outputted to a TPID bus 204 during a transaction by a master device with a value of a TPID register 211 of the slave device 210. The comparator 212 notifies a decoder 213 of a permission signal only when those values coincide with each other.

The decoder 213 determines to correctly respond to the transaction when a value of an address that has been outputted to the address bus 203 during the transaction by the master device is included in an address range assigned to the slave device and the comparator 212 has notified the decoder 213 of the permission signal. Then the decoder 213 carries out operations such as permitting access to an internal register 214.

Next, an operation of a memory including a microprocessor as a bus master device having a protection mechanism according to an embodiment of the present invention and an MPU as a slave device having a protection mechanism according to an embodiment of the present invention will be described with reference to FIG. 3.

A microprocessor 310 having a protection mechanism according to an embodiment of the present invention has a program counter (hereinafter referred to as a PC) 313 indicating the location of a next machine instruction to be executed, an address generator (hereinafter referred to as an AG) 312 for generating an address to be subjected to data access, and a PID register 314 for storing a value associated with the number of a process being currently executed.

Figure 6:
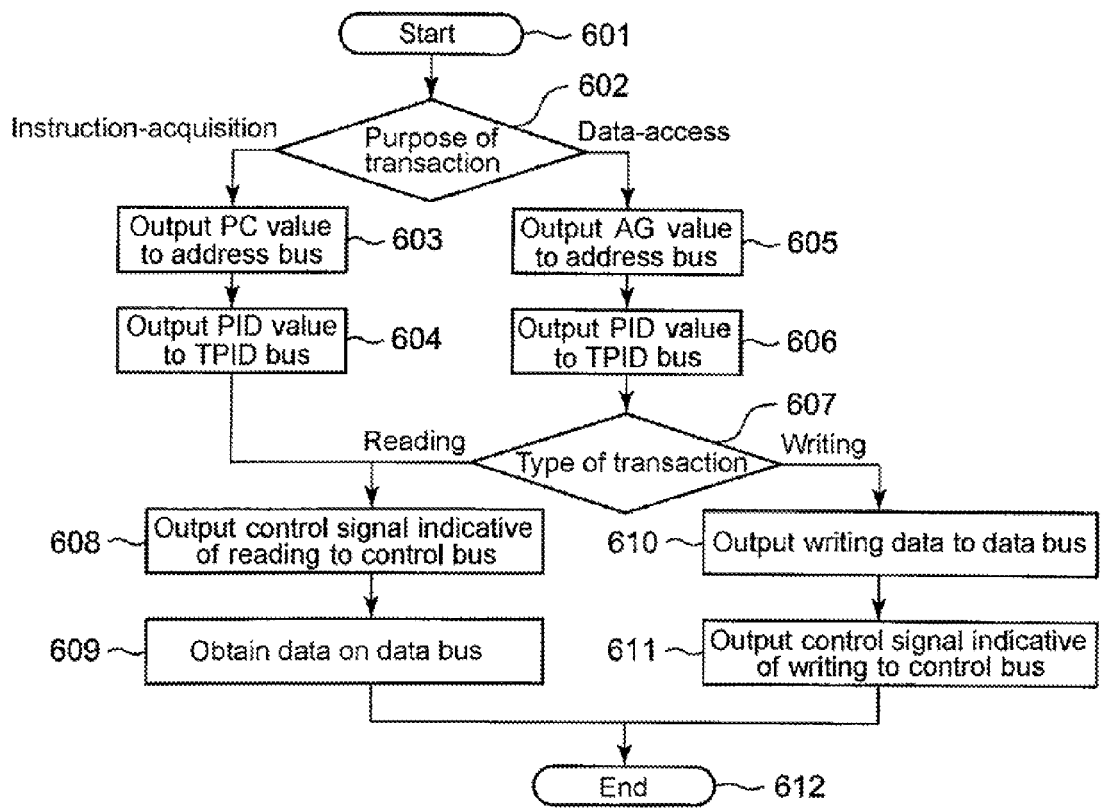
FIG. 6 is a flow chart showing an outlined operation of a microprocessor according to an embodiment of the present invention.

FIG. 6 shows a procedure in which the microprocessor 310 according to an embodiment of the present invention generates a transaction.

The purpose of generating a bus transaction is determined (Step 602). If the purpose is to obtain a next machine instruction to be executed, a bus interface unit (hereinafter referred to as a BIU) 311 outputs a value of the PC 313, which indicates the location of that instruction, to an address bus 303 (Step 603) and outputs a value of the PID register 314 to the TPID bus 304 (Step 604).

Furthermore, if the purpose is data-access, the BIU 311 outputs a value of an address to be accessed, which has been generated by the AG 312, to the system bus (Step 605) and outputs a value of the PID register 314 to the TPID bus 304 (Step 606).

The subsequent steps (Step 605 to Step 611) are the same as Step 504 to Step 508 in FIG. 5.

Next, a DMAC according to a third embodiment of the present invention will be described as another example of a master device according to an embodiment of the present invention with reference to FIG. 4.

The DMAC is a mechanism for autonomously performing a high-speed data transfer without the assistance of software on a microprocessor after initialization.

Figure 10:
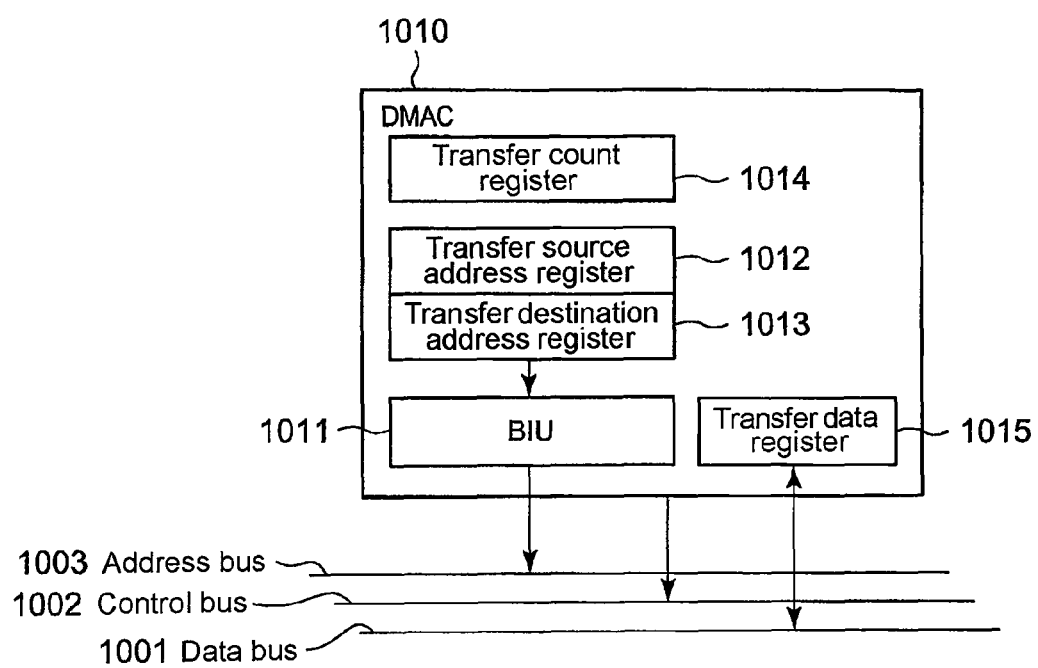
FIG. 10 is a block diagram showing an existing DMAC.

An example of an existing DMAC is illustrated in FIG. 10 to facilitate the understanding the third embodiment of the present invention.

FIG. 10 is an extraction of a primary portion from Intel 8257, which has been used since the nineteen-seventies. This DMAC includes a transfer destination address register 1012, a transfer destination address register 1013, and a transfer count register 1014. Values of those registers are initialized by software on the microprocessor.

As an example of a transaction of an existing DMAC, it is assumed that a transfer source is a peripheral device while a transfer destination is a memory. In this case, DMA is started by an instruction of a dedicated signal line from the peripheral device as a transfer source.

First, the DMAC 1010 operates as a master device. A bus interface unit (hereinafter referred to as a BIU) 1011 outputs a value of the transfer source address register 1012 to the address bus 1003, requests the peripheral device for reading data, and thus starts a transaction. Data read from the peripheral device are written into a transfer data register 1015 in the DMAC 1010.

Then the DMAC 1010 operates as a master device again. The DMAC 1010 outputs a value of the transfer destination address register 1013 to the address bus 1003 via the BIU 1011, outputs a value of the transfer data register 1015 to the data bus 1001, and thus starts a writing transaction to the memory.

The value of the transfer destination address register 1013 is renewed after completion of the writing transaction to the memory. The foregoing operations are repeated the number of times that has been set in the transfer count register 1014. The DMAC 1010 usually includes registers and signal terminals for setting of various operation modes and operation timing and for notification of a status, which have been omitted from the above explanation for the sake of brevity.

Figure 4:
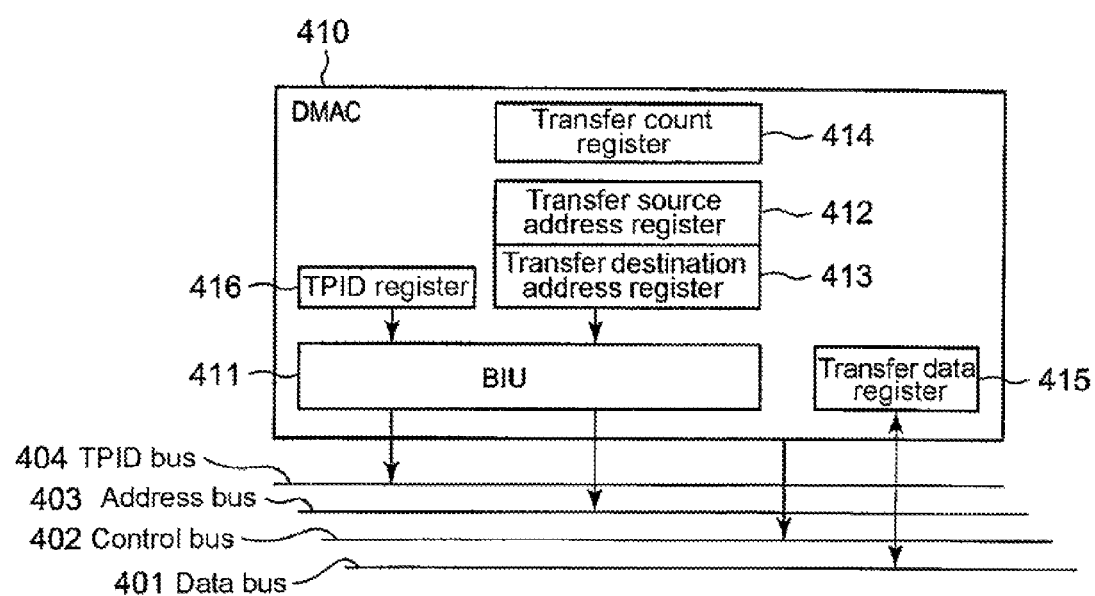
FIG. 4 is a block diagram showing a DMAC according to an embodiment of the present invention.

Next, a DMAC having a protection mechanism according to an embodiment of the present invention is illustrated in FIG. 4.

A DMAC 410 according to the present invention has a TPID register 416 in addition to a transfer source address register 412, a transfer destination address register 413, and a transfer count register 414. Values of those registers are initialized by software on the microprocessor.

As an example of a transaction of a DMAC according to an embodiment of the present invention, it is assumed that a transfer source is a peripheral device while a transfer destination is a memory. In this case, DMA is started by notification from the peripheral device as a transfer source. Means for notification may include laying a dedicated signal line from the peripheral device to the DMAC or the like.

First, the DMAC 410 operates as a master device. A BIU 411 outputs a value of the transfer source address register 412 to the address bus 403, outputs a value of the TPID register 416 to the TPID bus 404, requests the peripheral device for reading data, and thus starts a transaction. Data read from the peripheral device are written into a transfer data register 415 in the DMAC 410.

Then the DMAC 410 operates as a master device again. The DMAC 410 outputs a value of the transfer destination address register 413 to the address bus 403, outputs a value of the transfer data register 415 to the data bus 401, outputs a value of the TPID register 416 to the TPID bus 404, and thus starts a writing transaction to the memory.

The value of the transfer destination address register 413 is renewed after completion of the writing transaction to the memory. The foregoing operations are repeated the number of times that has been set in the transfer count register 414.

The embodiments of the present invention can be applied generally irrespective of differences in packaging details of the DMAC 410. For example, the number of DMA channels is one in FIG. 4 for the sake of brevity. Nevertheless, the same discussion holds true for a DMAC having a plurality of DMA channels. When a DMAC has a plurality of DMA channels, it may be configured to have a TPID register 416 common to all of the DMA channels or may be configured to have independent TPID registers 416 for the respective channels. Furthermore, although the transfer destination memory area is indicated by the transfer destination address register 413 and the transfer count register 414 in FIG. 4, the transfer destination memory area may be indicated by a transfer destination start address register and a transfer destination end address register.

Furthermore, data are transferred via the transfer data register 415 in FIG. 4. Nevertheless, data may he transferred from the peripheral device directly to the memory.

Moreover, the TPID register 416 may be configured to have independent values for a data transfer source and a data transfer destination, respectively.

Furthermore, in FIG. 4, the value of the TPID register 416 is initialized by the software on the microprocessor. In an alternate configuration, a value of the TPID bus 404 may automatically be obtained when the microprocessor accesses any one of the registers of the DMAC 410 (the transfer source address register, the transfer destination address register, the transfer count register, the mode setting register, the command register, the status register, and the like).

In the above description, the initialization of the DMAC 410 is performed by the software on the microprocessor. Nevertheless, the DMAC 410 may be configured to directly interpret a micro-program (also referred to as a descriptor) placed on a memory shared with the microprocessor or a dedicated memory of the DMAC for thereby initializing the DMAC.

Figure 2:
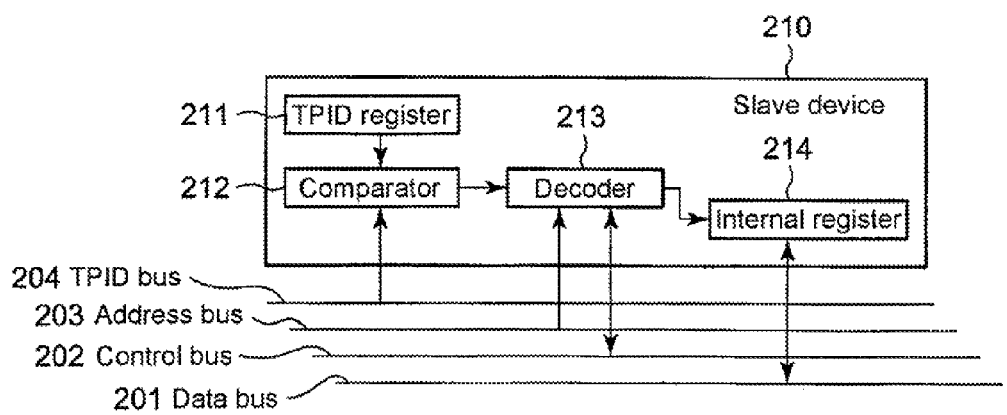
FIG. 2 is a block diagram showing a slave device according to an embodiment of the present invention.

A group of the internal registers of the DMAC 410 may be regarded as the slave device shown in FIG. 2 so that they can be protected by a protection mechanism. In the DMAC 410 shown in FIG. 4, the software on the microprocessor initializes the transfer source address register 412, the transfer destination address register 413, the transfer count register 414, and the TPID register 416. The DMAC 410 serves as a slave device during the initialization of those registers and accepts access from the microprocessor, which serves as a bus master device. Therefore, as shown in FIG. 2, the DMAC 410 has a TPID register as a slave device and can protect the registers.

The discussion relating to FIG. 4 is generally applicable to a peripheral device having a bus master function.

A bus master device having a protection mechanism according to the present invention starts a transaction to a memory by outputting a value of a memory address to be accessed to an address bus, a value of a TPID register to a TPID bus, and other required signals to a system bus.

Figure 3:
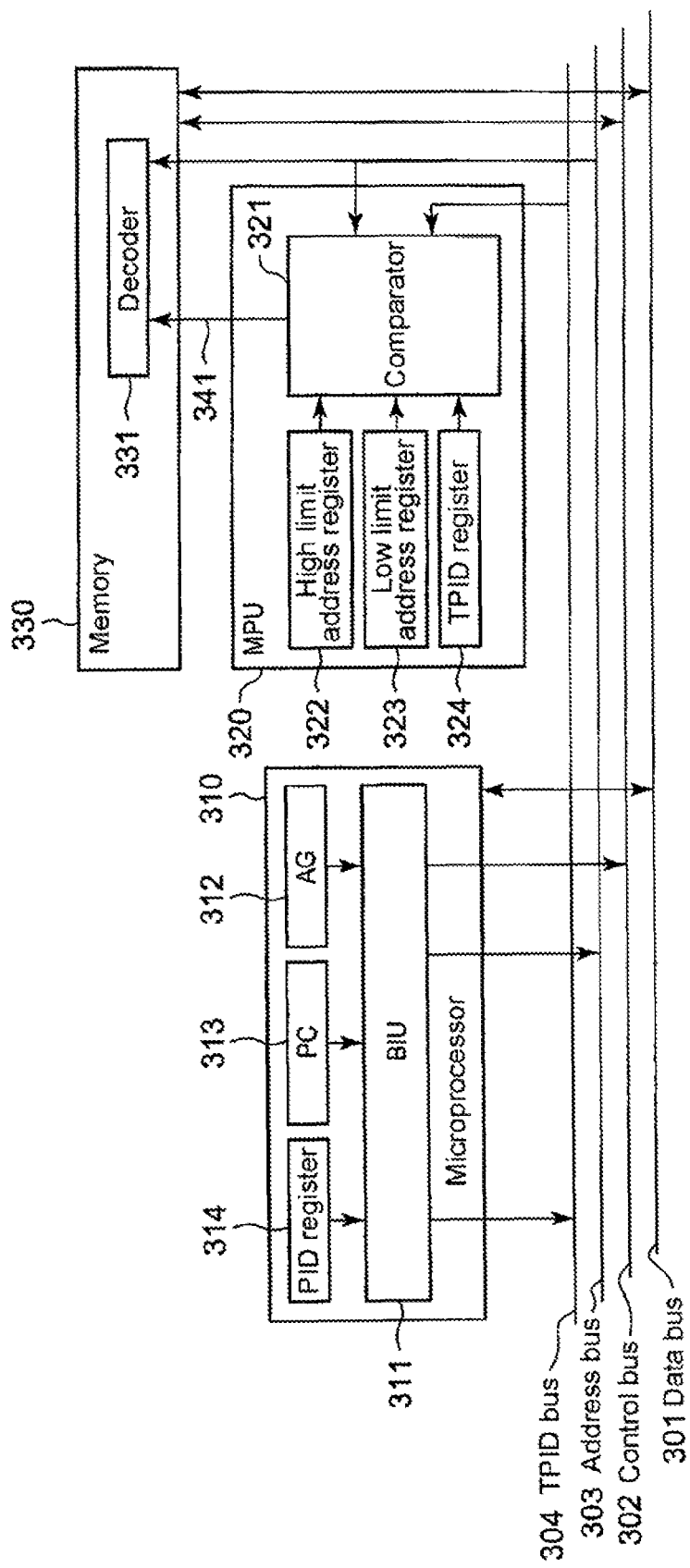
FIG. 3 is a block diagram showing a microprocessor and an MPU according to an embodiment of the present invention.

Next, an MPU according to a fourth embodiment of the present invention will he described as an example of a slave device having a protection mechanism according to an embodiment of the present invention with further reference to FIG. 3.

An MPU 320 is located between a system bus and a memory 330. The MPU 320 has a TPID register 324 in addition to a high limit address register 322 and a low limit address register 323, which are included in an existing MPU (FIG. 9).

Figure 7:
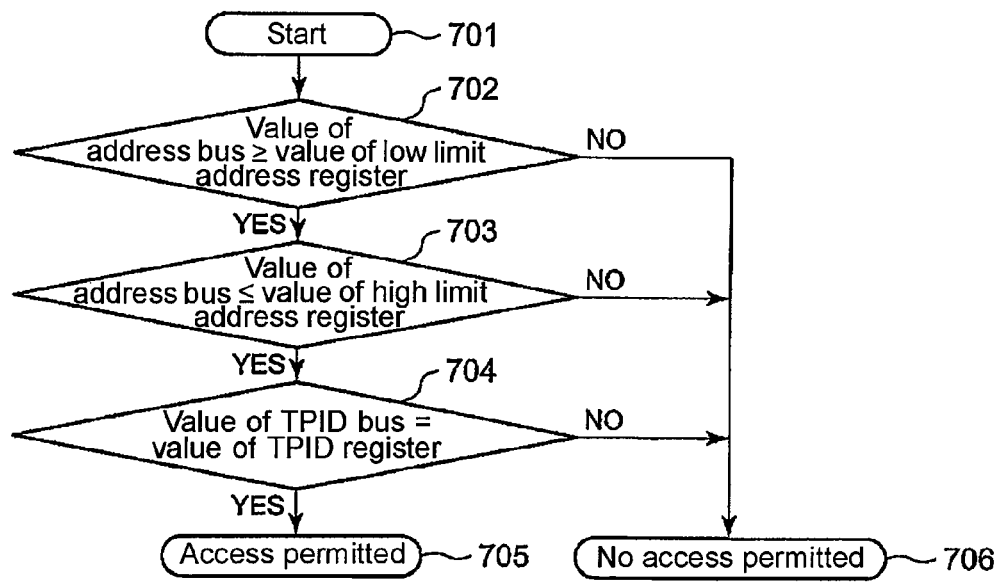
FIG. 7 is a flow chart showing an outlined operation of an MPU according to an embodiment of the present invention.

Now an operation of the MPU 320 is illustrated in FIG. 7.

When a transaction occurs, the MPU 320 compares a value of an address bus 303 of the system bus with values of the high limit address register 322 and the low limit address register 323 at a comparator 321. The MPU 320 permits access to the memory (Step 705) only when the value of the address bus is not less than the value of the low limit address register (Step 702) and is not more than the value of the high limit address register (Step 703), and the value of the TPID bus 304 coincides with the TPID register 324 (Step 704). Otherwise, the MPU 320 does not permit access to the memory (Step 706).

When a transaction occurs, the MPU 320 compares a value of an address bus 303 of the system bus with values of the high limit address register 322 and the low limit address register 323. The MPU 320 permits access to the memory when the value of the address bus 303 is not more than the value of the high limit address register and is not less than the value of the low limit address register. Otherwise, the MPU 320 blocks access to the memory.

In a single bus master system, an existing MPU can also provide protection from unauthorized access of other processes by switching registers (a high limit address register, a low limit address register, and the like) of the MPU at the time of switching the processes. However, this method requires switching registers of an MPU, which lengthens a period of time for switching the processes, and is thus unsuitable for a real-time system.

Furthermore, in a multiprocessor, which will become dominant in future, or in a computer system including at least one microprocessor and at least one accelerator having a bus master function, transactions that have been generated by different processes are mixed on a system bus at a fine granularity. Although an existing MPU cannot cope with such a situation, the MPU 320 according to the embodiment of the present invention (FIG. 3) can provide protection in such a case.

According to an embodiment of the present invention, access protection can be achieved irrespective of the type of a master device and a slave device. For example, access protection can be provided with the same mechanism when a master device is a microprocessor or a peripheral device such as a DMAC or an accelerator, or when a slave device is a memory or a peripheral device such as an input/output device.

Furthermore, according to an embodiment of the present invention, the same mechanism can operate irrespective of the number of master devices or slave devices connected on a system bus. For example, the same access protection mechanism can cope with a case where a plurality of microprocessors are provided. Furthermore, design of an existing portion does not need to be changed even if the number of slave devices increases.

Thus, according to an embodiment of the present invention, a versatile and scalable access protection mechanism can be achieved irrespective of the type or number of master devices and slave devices.

Although embodiments of the present invention have specifically been described, the present invention is not limited to the above embodiments. Various modifications can be made based upon the technical ideas of the present invention.

For example, for the PID register 314 of the microprocessor 310 (FIG. 3), an operating system operating on the microprocessor 310 may set the number of a software process being currently executed as it is or may set a value associated with the software process. In the latter case, the bit length in the PID register of the master device, the TPID bus, the TPID register of the slave device, and the comparator can be reduced to a length that is sufficient to cover the number of processes activated at the same time.

Furthermore, the TPID bus 104 is implemented by a dedicated signal line on the system bus. Nevertheless, details of the packaging of the system bus do not matter as long as one TPID value is assigned to one transaction. For example, the system bus may be configured to use physically the same signal line and to transmit an address value and a TPID value by time division multiplex.

Moreover, one slave device 210 has one TPID register 211 (FIG. 2). Nevertheless, one slave device 210 may have a plurality of TPID registers 211. Access to the slave device 210 may be permitted when the value of the TPID bus 204 coincides with any of values of the TPID registers 211. Furthermore, one slave device 210 may have a plurality of TPID registers 211 that are functionally separated, and access may be controlled in detail for each function.

Furthermore, access is permitted under such conditions that a value of the TPID bus 204 coincides with a value of the TPID register 211 of the slave device 210. Nevertheless, access may be permitted under other comparison conditions. For example, access may be permitted when a value of the TPID bus 204 is more than, is not less than, is less than, or is not more than a value of the TPID register 211 of the slave device 210.

Moreover, the slave device 210 permits access based upon the comparison result of the value of the TPID bus 204 and the value of the TPID register 211. Nevertheless, access may be permitted based upon a comparison result of the value of the TPID bus 204 and a fixed value without the TPID register 211.

For example, a specific value of the TPID may indicate that the microprocessor is in a privileged mode, and the slave device 210 may permit access with the specific TPID value. Furthermore, access may be permitted in consideration of both of a comparison result of a value of the TPID bus 204 and a fixed value and a comparison result of a value of the TPID bus 204 and a value of the TPID register 211.

Furthermore, the slave device 210 separately includes the decoder 213 for comparing an address assigned to the slave device 210 with a value of the address bus 203 and the comparator 212 for comparing a value of the TPID register 211 and a value of the TPID bus 204. Nevertheless, the decoder 213 and the comparator 212 may be integrated with each other as they have similar functions.

Moreover, the decoder 213 and the comparator 212 are provided for each of slave devices 210. Nevertheless, part or all of decoders and comparators of a plurality of slave devices may be integrated into a centralized control. Furthermore, the PID register of the master device may also be integrated.

The MPU has been taken up as a protection mechanism of a memory, and the protection mechanism with the TPID has been described. Nevertheless, a protection mechanism according to the present invention may adopt an MMU as a protection mechanism of a memory. A microprocessor having an MMU usually includes a PID register and internally uses the PID register to improve a hit ratio of a TLB. Therefore, such a microprocessor can be used as a master device having a protection mechanism according to the present invention merely by fetching a value of the PID register for the system bus.

In a practical computer system, a microprocessor has various cache mechanisms and prediction mechanisms for increasing the speed and reducing electric power consumption, in addition to fundamental components of FIG. 3. Therefore, not only a PC value indicative of an address of a next machine instruction to be executed, but also a future predicted PC value may be outputted to the address bus. At that time, a value associated with a process number to which the original PC value of the prediction belongs is outputted to the TPID bus.

The present application claims the benefit of priority from Japanese patent application No. 2009-097813, filed on Apr. 14, 2009, the disclosure of whish is incorporated herein in its entirety by reference.

The invention claimed is:

1. A computer system, comprising:
a master device which includes a first register for storing a first process ID associated with a software process number and which transmits the first process ID onto a system bus when generating a transaction; and
a slave device which holds a second process ID for permitting access and which accepts the transaction when the first process ID and the second process ID meet a predetermined condition,
wherein the slave device includes a determination section for comparing the first process ID and the second process ID with each other and permitting the access only when the first process ID and the second process ID coincide with each other,
wherein the determination section includes a comparison section for comparing the first process ID and the second process ID with each other and a decoder for receiving a permission signal only when the first process ID and the second process ID coincide with each other in a comparison result,
and wherein the decoder determines to correctly respond to the transaction and permits the access when the address to be accessed that has been outputted to the address bus is included in an address range assigned to the slave device and the decoder receives the permission signal from the comparison section.

2. A computer system, comprising:
a master device which includes a first register for storing a first process ID associated with a software process number and which transmits the first process ID onto a system bus when generating a transaction; and
a slave device which holds a second process ID for permitting access and which accepts the transaction when the first process ID and the second process ID meet a predetermined condition,
wherein the system bus has at least an address bus and a process ID bus, and the master device outputs an address to be accessed into the address bus and outputs the first process ID to the process ID bus, when starting the transaction,
and wherein the master device is a microprocessor, and the slave device is a memory having an MPU,
the MPU is located between the system bus and the memory and has a second register, and
the MPU permits access to the memory if a value of the address bus is within a predetermined address range when the transaction is generated, and the first process ID and the second process ID coincide with each other.

3. The computer system as recited in claim 2, wherein a number of a software process being currently executed by an operating system operating on the microprocessor is set into the first register of the microprocessor.

4. The computer system as recited in claim 2, wherein a value associated with a software process being currently executed by an operating system operating on the microprocessor is set into the first register of the microprocessor.

5. A computer system, comprising:
a master device which includes a first register for storing a first process ID associated with a software process number and which transmits the first process ID onto a system bus when generating a transaction; and
a slave device which holds a second process ID for permitting access and which accepts the transaction when the first process ID and the second process ID meet a predetermined condition,
wherein the master device and the slave device are a DMAC connected between a peripheral device and a memory,
the DMAC operates as the master device for transmitting the first process ID stored in the first register onto the system bus to start the transaction and for writing data read from the peripheral device into a transfer data register in the DMAC, and
the DMAC operates as the master device again for outputting a value of the transfer data register to the system bus to start a writing transaction to the memory.

6. The computer system as recited in claim 5, wherein a value of the first register is initialized by software on a microprocessor.

7. The computer system as recited in claim 5, wherein the first register automatically obtains a value of the system bus when a microprocessor accesses a register of the DMAC.

8. The computer system as recited in claim 5, wherein a group of internal registers of the DMAC is handled as the slave device, and
the DMAC operates as the slave device for accepting access from a microprocessor operating as the master device during initialization of the first register.

* * * * *